United States Patent [19]

Horn et al.

[11] 4,331,642

[45] May 25, 1982

[54] PROCESS FOR PREPARING ALUMINUM OR MAGNESIUM PHOSPHIDE

[75] Inventors: Franziskus Horn, Rodejew; Ekkehard Fluck, Frankfurt am Main, both of Fed. Rep. of Germany

[73] Assignee: Degesch GmbH, Frankfurt, Fed. Rep. of Germany

[21] Appl. No.: 193,481

[22] Filed: Oct. 3, 1980

[30] Foreign Application Priority Data

Nov. 12, 1979 [DE] Fed. Rep. of Germany ....... 2945647

[51] Int. Cl.$^3$ ............................................. C01B 25/08
[52] U.S. Cl. ................................................. 423/299
[58] Field of Search ........................ 423/299, 111, 155

[56] References Cited

U.S. PATENT DOCUMENTS 3,532,464 10/1970 Friemel ............................... 423/299
3,899,572 8/1975 Watanabe et al. ................... 423/299

OTHER PUBLICATIONS

Wayne E. White & A. H. Bushey, J.A.C.S., "Alumium Phosphide–Preparation & Composition", Oct. 1944, vol. 66, pp. 1666–1672.

*Primary Examiner*—O. R. Vertiz
*Assistant Examiner*—Margaret B. Medley
*Attorney, Agent, or Firm*—Cushman, Darby & Cushman

[57] ABSTRACT

The phosphide of aluminum or magnesium is prepared by a process comprising reacting the finely divided metal or an alloy of both metals with yellow phosphorus at a temperature between 300° and 600° C. in an inert gas atmosphere and in the presence of a catalyst which is chlorine, bromine or iodine or a compound of such element with phosphorus, sulfur, hydrogen, ammonium, zinc or of the metal which is being reacted.

14 Claims, No Drawings

PROCESS FOR PREPARING ALUMINUM OR MAGNESIUM PHOSPHIDE

BACKGROUND OF THE INVENTION

The subject of the invention is a process for the production of aluminum or magnesium phosphide by reaction of the finely divided metal or an alloy of the two metals with phosphorus.

Various agents which are used for fighting pests, especially insects and rodents contain as the effective component aluminum phosphide or magnesium phosphide. Therefore there is considerable interest in a safe and clean process for producing these phosphides.

It is known to produce various kinds of metal phosphides by melting together the metal with red phosphorus. Since the reaction between, for example, aluminum or magnesium powder and red phosphorus is strongly exothermic, it is sufficient to mix the metal powder with the red phosphorus and to bring the mixture to reaction by ignition. However, during the reaction the temperature becomes so high that a portion of the phosphorus vaporizes and burns in the air. In the case of the reaction of magnesium powder with red phosphorus explosions can even occur. The yields producible in this method of operation consequently are generally unsatisfactory.

SUMMARY OF THE INVENTION

The process of the invention is characterized by reacting the metal with yellow phosphorus at a temperature between 300° and 600° C. in an inert gas atmosphere and in the presence of chlorine, bromine, iodine or a compound of the named elements (i.e. halogen of atomic weight 35 to 127 with phosphorus, sulfur, hydrogen, zinc or with the reacting metal, ammonium halides or water as a catalyst. The catalytic compound can also have present oxygen in some cases.

The catalyst can be mixed with the metal or the yellow phosphorus before the reaction. It is advantageous if the metal is present in powder or grit form and the yellow phosphorus is slowly added in liquid form. Besides it is suitable if the reaction mixture is mechanically stirred during the reaction.

It is possible through the process of the invention to produce the phosphide of aluminum or magnesium or a mixture of these phosphides in large amounts, safely and in almost quantitative yields. The process is very favorable to the environment since the process occurs in a closed system. Besides the metal phosphide formed contains no mentionable amounts of polyphosphides. This has an effect in the later use of these metal phosphides in fighting pests, inasmuch as in its hydrolysis only hydrogen phosphide is formed, which does not ignite by itself in the air and there are scarcely any higher phosphanes such as diphosphane which are self igniting. Water, the elements chlorine, bromine or iodine or their hydrogen, ammonium, sulfur, phosphorus, zinc, aluminum or magnesium compounds such as HCl, $NH_4Cl$, $SCl_2$, $SOCl_2$, $SO_2Cl_2$, $PCl_3$, $PBr_3$, $PI_3$, $PCl_5$, $P_2I_4$, $POCl_3$, $ZnCl_2$, $ZnBr_2$, $AlCl_3$, $AlBr_3$, $MgCl_2$, $MgBr_2$ or $MgI_2$ serving as catalysts in the process of the invention are suitably employed in such an amount that the weight ratio between the reacting metal and the catalyst is in the range of 10,000:1 to 10,000:200.

Additional compounds useful in the process of the invention include HBr, HI, $NH_4Br$, $NH_4I$, $SBr_2$, $SO_2Br_2$, $POBr_3$, $AlI_3$, and $PBr_5$.

In an especially preferred illustration form of the process of the invention there is first intimately mixed the finely powdered or grit form metal with the catalyst. The mixture is heated in a suitable reactor capable of being closed in an inert atmosphere, for example under nitrogen (or argon) at normal pressure (i.e., atmospheric pressure) to a reaction temperature between 300° and 600° C. When the desired reaction temperature is reached liquid yellow phosphorus is added at such a speed that the heat of reaction liberated is led off without problem and the temperature in the range between 300° and 600° C. can be maintained. Under these conditions the reaction is readily controllable and the metal employed does not melt. When the required amount of phosphorus is added there follows in suitable manner a post reaction time of appropriate duration, in order to make possible the most complete reaction. The temperature is also held in the range between 300° and 600° C. during the post reaction time. When the reaction is ended, the reaction product is removed warm under inert gas through an outlet device arranged below the reactor.

The process can comprise, consist essentially of or consist of the stated steps using the stated materials.

Unless otherwise indicated all parts and percentages are by weight.

The invention will be explained in more detail in the following examples:

EXAMPLE 1

200 grams of magnesium grits were heated to 350° C. under nitrogen with 0.8 gram of iodine in a reaction vessel closed by a water seal. The heating was turned off and 157 grams of liquid yellow phosphorus were mixed into the reaction mixture so slowly that the temperature did not increase above 500° C. The time of addition was around 30 minutes. The gray, gritty product can be withdrawn from the reactor without difficulty. Yield: 356 grams; content of $Mg_3P_2$:89%

EXAMPLE 2

400 grams of magnesium grits were heated to 300° C. with mechanical stirring under nitrogen in a reaction vessel closed by a water trap. 320 grams of yellow phosphorus and 3 grams of iodine were mixed and heated to 50° C. in a dropping funnel. The phosphorus-iodine mixture was then slowly added to the heated metal. Time of addition: about 25 minutes. The temperature increased up to 510° C. Yield: 715 grams; Content of $Mg_3P_2$:94.5%

EXAMPLE 3

200 grams of magnesium grits were mixed under nitrogen with 1 gram of diphosphorus tetraiodide in a reaction vessel closed by a water trap and heated to 360° C. After the heating was shut off, 162 grams of liquid yellow phosphorus were added so slowly that the temperature did not increase above 500° C. Time of addition: about 25 minutes. The gray, gritty product can be withdrawn from the reactor without difficulty. Yield: 361 grams; Content of $Mg_3P_2$:95.5%.

EXAMPLE 4

100 grams of magnesium grits were mixed under nitrogen with 3 grams of bromine in a reaction vessel closed by a water trap and heated to 300° C. After the heating was shut off, 80 grams of liquid yellow phosphorus were slowly supplied to the reaction mixture.

The temperature did not increase above 480° C. Time of addition: about 35 minutes. The gray, gritty product can be poured out of the reactor without difficulty. Yield: 178 grams; Content of Mg$_3$P$_2$:89%.

EXAMPLE 5

30 grams of magnesium grits were heated under nitrogen to 320° C. in a reaction vessel closed by a water trap. After the heating was shut off, there was slowly added to the reaction vessel a liquid mixture of 24 grams of yellow phosphorus and 0.3 gram of bromine. The temperature did not increase above 390° C. Time of addition: 20 minutes.

The reaction mixture was held at 380° C. for a further 20 minutes, then the gritty product can be poured out of the reactor without difficulty. Yield: 54 grams; Content of Mg$_3$P$_2$:87%.

EXAMPLE 6

10 kg of magnesium grits were mixed with 40 grams of iodine under nitrogen in a reaction vessel closed by a water trap and heated to 350° C. After the heating was shut off there were slowly added to the reaction mixture 8.5 kg of liquid yellow phosphorus. During the addition the temperature increased to not over 480° C. The reaction mixture during the entire reaction time was mechanically stirred. Duration of the addition: 70 minutes. The gray, gritty product was discharged below through an opening without again opening the reactor; Yield: 18.4 kg; Content of Mg$_3$P$_2$:95%.

EXAMPLE 7

100 grams of magnesium-aluminum alloy-grits (50% magnesium, 50% aluminum) were mixed with 2 grams of bromine under nitrogen in a reaction vessel closed by a water trap and heated to 330° C. After the heating was stopped there were slowly added to the reaction mixture 100 grams of liquid yellow phosphorus. The temperature did not increase above 450° C. Time of addition: about 30 minutes. The gray, gritty product can be poured out of the reactor without difficulty. Yield: 200 grams; Content of magnesium phosphide and aluminum phosphide: 95%

EXAMPLE 8

1.5 kg of magnesium-aluminum alloy grits (50% magnesium, 50% aluminum) were mixed with 15 grams of iodine under nitrogen in a reaction vessel closed by a water trap and heated to 360° C. After the heating was shut off there were slowly added to the reaction mixture 1.5 kg of liquid yellow phosphorus. The temperature did not increase above 450° C. Time of addition: 30 minutes. The gray, gritty product can be poured out of the reactor without difficulty. Yield: 2.9 kg; Content of magnesium phosphide and aluminum phosphide: 90%.

EXAMPLE 9

64 grams of aluminum grits were mixed with 1 gram of iodine under nitrogen in a reaction vessel closed by a water trap and heated to 380° C. After the heating was shut off there were slowly added 62 grams of yellow phosphorus. The temperature increased thereby to not over 500° C. Time of addition: about 30 minutes.

The gray, gritty product can be poured out of the reactor without difficulty. Yield: 122 grams; Content of aluminum phosphide: 85%.

EXAMPLE 10

300 kg of magnesium grits were mixed with 1 kg of iodine. 240 kg of yellow phosphorus were melted and both, yellow phosphorus and the metal grits were simultaneously mixed in a reaction vessel during 6 hours. During the addition the reaction temperature increased to not over 500° C. The reaction mixture during the entire reaction time was mechanically stirred. After the reaction vessel contained 200 kg of the product it was discharged continously at the reaction rate. Yield 540 kg of a gray, gritty product. Content of Mg$_3$P$_3$:90%.

What is claimed is:

1. A process of preparing the phosphide of aluminum or magnesium comprising reacting the finely divided metal or an alloy of the two metals with yellow phosphorus at a temperature between 300° and 600° C. in an inert gas atmosphere and in the presence of a catalytically effective amount of the element chlorine, bromine or iodine or a compound of such element with phosphorus, sulfur, hydrogen, ammonium zinc or the metal being reacted.

2. A process according to claim 1 wherein the catalyst is mixed with the metal before the reaction.

3. A process according to claim 1 wherein the catalyst is mixed with the yellow phosphorus before the reaction.

4. A process according to claim 1 wherein the yellow phosphorus is slowly added in liquid form.

5. A process according to claim 1 wherein the reaction mixture is stirred mechanically during the reaction.

6. A process according to claim 1 wherein the metal or alloy is employed in the form of grits.

7. A process according to claim 1 wherein the weight ratio between the metal being reacted and the catalyst is between 10,000:1 and 10,000:200.

8. A process according to claim 1 wherein the catalyst is HCl, NH$_4$Cl, SCl$_2$, SOCl$_2$, SO$_2$Cl$_2$, PCl$_3$, PBr$_3$, PI$_3$, PCl$_5$, P$_2$I$_4$, POCl$_3$, ZnCl$_2$, ZnBr$_2$, AlCl$_3$, AlBr$_3$, MgCl$_2$, MgBr$_2$, MgI$_2$, chlorine, bromine or iodine.

9. A process according to claim 8 wherein the weight ratio between the metal being reacted and the catalyst is between 10,000:1 and 10,000:200.

10. A process according to claim 1 wherein the catalyst is chlorine, bromine or iodine.

11. A process according to claim 10 wherein the catalyst is bromine or iodine.

12. A process according to claim 1 wherein the catalyst is P$_2$I$_4$.

13. A process according to claim 2 wherein the metal or alloy is slowly added during the reaction.

14. A process according to claim 3 wherein the reaction product is discharged continuously during the reaction.

* * * * *